(12) United States Patent
Resetco et al.

(10) Patent No.: US 11,692,068 B2
(45) Date of Patent: Jul. 4, 2023

(54) FUNCTIONALIZED SILICONE MATERIALS FOR THREE-DIMENSIONAL PRINTING

(71) Applicant: Xerox Corporation, Norwalk, CT (US)

(72) Inventors: Cristina Resetco, Toronto (CA); Valerie M. Farrugia, Oakville (CA)

(73) Assignee: Xerox Corporation, Norwalk, CT (US)

( * ) Notice: Subject to any disclaimer, the term of this patent is extended or adjusted under 35 U.S.C. 154(b) by 505 days.

(21) Appl. No.: 16/364,367

(22) Filed: Mar. 26, 2019

(65) Prior Publication Data

US 2020/0308348 A1 Oct. 1, 2020

(51) Int. Cl.

| | |
|---|---|
| *C08K 3/36* | (2006.01) |
| *C08G 77/26* | (2006.01) |
| *B29C 64/153* | (2017.01) |
| *C08G 77/12* | (2006.01) |
| *C08G 77/18* | (2006.01) |
| *C08K 5/07* | (2006.01) |
| *C08K 5/092* | (2006.01) |
| *C08K 5/1539* | (2006.01) |
| *C08K 9/06* | (2006.01) |
| *B33Y 10/00* | (2015.01) |
| *B33Y 70/00* | (2020.01) |
| *B29K 83/00* | (2006.01) |

(52) U.S. Cl.
CPC ............ *C08G 77/26* (2013.01); *B29C 64/153* (2017.08); *C08G 77/12* (2013.01); *C08G 77/18* (2013.01); *C08K 3/36* (2013.01); *C08K 5/07* (2013.01); *C08K 5/092* (2013.01); *C08K 5/1539* (2013.01); *C08K 9/06* (2013.01); *B29K 2083/00* (2013.01); *B33Y 10/00* (2014.12); *B33Y 70/00* (2014.12)

(58) Field of Classification Search
CPC ......... C08G 77/26; C08G 77/388; C08K 3/36
USPC ..................................... 528/26, 38
See application file for complete search history.

(56) References Cited

U.S. PATENT DOCUMENTS

| | | | | |
|---|---|---|---|---|
| 5,976,557 | A * | 11/1999 | Friedrich | A61F 7/007 424/401 |
| 9,604,407 | B2 | 3/2017 | Leighton et al. | |
| 10,155,884 | B2 | 12/2018 | Kenney et al. | |
| 2008/0004414 | A1* | 1/2008 | Schorzman | G02B 1/043 528/26 |
| 2017/0312981 | A1 | 11/2017 | Selbertinger et al. | |
| 2017/0355824 | A9* | 12/2017 | Feng | C08G 77/26 |
| 2018/0022043 | A1 | 1/2018 | Keoshkerian et al. | |
| 2018/0078486 | A1* | 3/2018 | Kadlec | A61K 8/891 |
| 2018/0370141 | A1 | 12/2018 | Eller et al. | |

FOREIGN PATENT DOCUMENTS

| | | |
|---|---|---|
| CN | 108 359 245 A | 8/2018 |
| EP | 3 418 331 A1 | 12/2018 |

OTHER PUBLICATIONS

Y.A. Ammar, et al., "Reactivity of 2,3-Pyridine Dicarboxylic Anhydride Towards Some Nitrogen Nucleophilic Reagents: Synthesis and Antimicrobial Evaluation of Some Pyridine Carboxamide and Pyrrolo [3,4-B] Pyridine-5,7-Dione Derivatives," Chemical Sciences Journal, vol. 2011: CSJ-16, Published Jun. 27, 2011.
Sturgess, et al., "3D Reactive Inkjet Printing of Polydimethylsiloxane," J. Mater. Chem. C, 2017, 5, 9733.
Lai, et al., "A Rigid And Healable Polymer Cross-Linked By Weak But Abundant Zn(II) Carboxylate Interactions," Nature Communications, (2018)9:2725.
Liravi, et al., "Additive Manufacturing Of Silicone Structures: A Review And Prospective," Additive Manufacturing 24 (2018) 232-242.
Velan, et al., "Aliphatic Amine Cured PDMS-Epoxy Interpenetrating Network System For High Performance Engineering Applications—Development And Characterization," Bull. Mater. Sci., vol. 23, No. 5, Oct. 2000, pp. 425-429.
Yu et al., "Dielectric Elastomers, With Very High Dielectric Permittivity, Based On Silicone And Ionic Interpenetrating Networks," RSC Adv., 2015, 5, 49739.
Bagwe, et al., "Surface Modification of Silica Nanoparticles to Reduce Aggregation and Nonspecific Binding," Langmuir 2006, 22, 4357-4362.
Extended European Search Report issued in European Application No. 20164048.9-1107, dated Aug. 26, 2020.

\* cited by examiner

*Primary Examiner* — Margaret G Moore
(74) *Attorney, Agent, or Firm* — Marylou J. Lavoie, Esq. LLC

(57) ABSTRACT

A material for three-dimensional printing including at least one of a functionalized silicone polymer, a functionalized silica particle, or a combination thereof; wherein the functionalized silicone polymer is functionalized with a member of the group consisting of a carboxylic acid, an amine, and combinations thereof; and wherein the functionalized silica particle is functionalized with a member of the group consisting of a carboxylic acid, an amine, and combinations thereof. A process for preparing the three-dimensional printing material. A process for three-dimensional printing use of the material.

24 Claims, No Drawings

FUNCTIONALIZED SILICONE MATERIALS FOR THREE-DIMENSIONAL PRINTING

BACKGROUND

Disclosed herein is a material for three-dimensional printing comprising at least one of a functionalized silicone polymer, a functionalized silica particle, or a combination thereof; wherein the functionalized silicone polymer is functionalized with a member of the group consisting of a carboxylic acid, an amine, and combinations thereof; and wherein the functionalized silica particle is functionalized with a member of the group consisting of a carboxylic acid, an amine, and combinations thereof. In embodiments, the hardness of the material is determined by the selection of concentration of carboxylic acid, concentration of amine, ratio of carboxylic acid to amine, or a combination thereof, on the functionalized silicone polymers or functionalized silica particles.

Further disclosed is a process for preparing a material for three-dimensional printing comprising providing at least one of a silicone polymer, a silica particle, or a combination thereof; and functionalizing the silicone polymer or silica particle with a member of the group consisting of a carboxylic acid, an amine, or a combination thereof.

Further disclosed is a method for three-dimensional printing comprising providing a material for three-dimensional printing comprising at least one of a functionalized silicone polymer, a functionalized silica particle, or a combination thereof; wherein the functionalized silicone polymer is functionalized with a member of the group consisting of a carboxylic acid, an amine, and combinations thereof; and wherein the functionalized silica particle is functionalized with a member of the group consisting of a carboxylic acid, an amine, and combinations thereof; disposing the material in one or more layers; and optionally, exposing the disposed material to at least one treatment to harden or cure the material.

Additive manufacturing (also known as three dimensional printing) as practiced in industry has been to date, mostly concerned with printing structural features. The main materials used are thermoplastics that offer form but not function. There is great interest in the field to develop improved materials that can be used to easily print completely integrated functional objects with limited post-processing and post-assembly. This would allow new designs, higher complexity, and customization in the manufacturing and consumption of everyday objects.

Various three-dimensional (3D) printing processes exist, including material extrusion, material jetting, stereolithography, selective laser sintering and others. Every specific 3D printing method requires suitable materials that can be processed by the printer and formed into a final object with various properties. The material extrusion 3D printing process uses a nozzle to deposit materials layer by layer with the possibility of preheating the material to aid in dispensing. The material jetting process uses a moving print head that deposits droplets of materials that are subsequently cured. The stereolithography process uses a liquid photocurable resin that is placed in a vat and selectively cured/hardened by a laser.

Selective laser sintering (SLS) uses a rasterized laser to scan over a bed of polymer powder, sintering it to form solid shapes in a layer-wise fashion. When the laser beam scans the powder, the powder melts due to the rising temperature, and layer by layer, the final part approaches full density and should result in properties similar to those of the bulk material (that is, the polymer). In theory, every thermoplastic polymer that can be transformed into a powder form can be processed via this technique, but the reality is that every material behaves differently, often unpredictably, during melting, coalescence, and consolidation, and often requires unique SLS processing parameters. The bed temperature and laser energy input, for example, can be selected based on the processing window of the polymer's thermal profile as well as its energy absorption. Laser parameters can also be selected based on the powder's particle size and shape.

U.S. Patent Application Publication 2018/0022043 (Application No. 15/215,285), which is hereby incorporated by reference herein in its entirety, describes in the Abstract thereof a method of selective laser sintering. The method comprises providing composite particles made by emulsion aggregation, the composite particles comprising at least one thermoplastic polymer and at least one carbon particle material. The composite particles are exposed to a laser to fuse the composite particles. Therefore, formulation of specialized materials that are suitable for different 3D printing processes is necessary for the adoption of this technology in industrial manufacturing and other applications, such as biomedical implants and devices.

Methods for producing silicone elastomers via 3D printing and additive manufacturing have been described in the art. The process typically involves crosslinkable/curable silicone material, which is hardened/cured by means of electromagnetic radiation. U.S. Pat. No. 10,155,884, which is hereby incorporated by reference herein in its entirety, describes a 3D printing method utilizing a photocurable silicone composition, which is printed layer by layer and irradiated to form an at least partially cured layer. Due to the requirements of the curing process (UV irradiation intensity, time, presence of catalysts and reactive components), only specially formulated curable silicone compositions are suitable for 3D printing. U.S. Patent Application Publication 2017/0312981 A1 (application Ser. No. 15/524,834), which is hereby incorporated by reference herein in its entirety, describes in the Abstract thereof a process of depositing droplets of curable silicone onto a substrate layer by layer and irradiation with electromagnetic energy. The silicone rubber composition used is addition-crosslinking and is crosslinked by electromagnetic radiation. U.S. Patent Application Publication 2018/0370141 A1 (application Ser. No. 15/779,627), which is hereby incorporated by reference herein in its entirety, describes an additive 3D printing method for the production of silicone elastomers. The method involves precisely positioning portions of crosslinkable silicone material and crosslinking by means of electromagnetic radiation. The requirements of curing by electromagnetic radiation pose certain limitations on the formulation of new materials and the use in 3D printing. Therefore, there remains a need for additional and alternative mechanisms of hardening of silicone elastomers that are compatible with different processing methods, such as 3D printing.

Development of materials with tunable properties for three-dimensional printing has been challenging due to the technical requirements of three-dimensional printing that limit the type of materials that can be produced. In particular, obtaining soft or hard materials with different elastic moduli and elongation and break is challenging and requires multiple raw materials with different properties. One approach to this problem encompassed printing multiple types of materials and combining them into a final composite material.

U.S. Pat. No. 9,604,407, which is hereby incorporated by reference herein in its entirety, describes in the Abstract thereof a method for printing a three-dimensional tissue scaffold. An embodiment can include printing a first layer of scaffold fiber with a printer onto a base gel substrate; and disposing a first gel layer over the printed first layer. Another embodiment can include printing a first and second sacrificial fiber with a printer onto a base gel substrate; printing a first scaffold fiber between the first and second sacrificial fiber between the first and second sacrificial fiber to form a printed first layer; and disposing a first gel layer over the printed first layer.

While currently available three-dimensional printing materials and processes may be suitable for their intended purposes, there remains a need for improved three-dimensional printing materials and processes. There further remains a need for more efficient and simplified three-dimensional printing materials and processes, particularly for such improved materials and processes that are suitable for larger scale and faster processing times. There further remains a need for three-dimensional printing materials and processes that can be tuned to a desired hardness or softness. There further remains a need for three-dimensional printing materials and processes that are biocompatible. There further exists a need for different hardening/fusing processes of materials, especially silicone elastomers.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a material for three-dimensional printing comprising at least one of a functionalized silicone polymer, a functionalized silica particle, or a combination thereof; wherein the functionalized silicone polymer is functionalized with a member of the group consisting of a carboxylic acid, an amine, and combinations thereof; and wherein the functionalized silica particle is functionalized with a member of the group consisting of a carboxylic acid, an amine, and combinations thereof.

Also described is a process for preparing a material for three-dimensional printing comprising providing a silicone polymer or a silica particle; and functionalizing the silicone polymer or silica particle with a member of the group consisting of a carboxylic acid, an amine, or a combination thereof.

Also described is a method for three-dimensional printing comprising providing a material for three-dimensional printing comprising at least one of a functionalized silicone polymer, a functionalized silica particle, or a combination thereof; wherein the functionalized silicone polymer is functionalized with a member of the group consisting of a carboxylic acid, an amine, and combinations thereof; and wherein the functionalized silica particle is functionalized with a member of the group consisting of a carboxylic acid, an amine, and combinations thereof; disposing the material in one or more layers; and optionally, exposing the disposed material to at least one treatment to harden or cure the material.

DETAILED DESCRIPTION

Described herein are silicone and silica materials that are reinforced by (or functionalized with) at least one of a carboxylic acid group, an amine group, or a combination thereof, to provide three-dimensional printing materials that can be hardened without requiring UV (ultra-violet) or thermal curing. In embodiments, the three-dimensional printing materials can be hardened by the intermolecular interactions between functional groups. The three-dimensional printing material including the present functional additives has advantages in that it does not require initiators/catalysts, it is insensitive to oxygen, and it is not limited by the thickness of the material. In certain embodiments, the silicone or silica materials are functionalized with both carboxylic acid groups and amine groups. Multiple functional groups incorporated into polymer chains result in strong intermolecular interactions between polymers that contribute to physical hardening of the material.

In embodiments, silicones functionalized with carboxylic acid and amine groups are provided and optionally, UV curing, thermal curing, or a combination thereof, is employed to produce both soft and hard materials via three-dimensional printing. The functional groups in the silicone precursors provide mechanical reinforcement and hardening of the resulting materials. Silica particles or functionalized silica particles with amine and carboxylic acid groups can be added into the silicone materials to achieve increased hardness and toughness.

The present functionalized materials provide advantages for three-dimensional printing including (1) enabling a variety of soft and hard materials that can be easily obtained by changing the concentration and ratio of carboxylic acid groups and amine groups; (2) physical hardening of materials due to intermolecular interactions between functional groups; (3) two-stage material hardening process comprising a first stage of physical hardening via intermolecular interactions of functional groups and a second stage of chemical, UV, or thermal cure; and (4) mechanical reinforcement that is independent of material thickness and temperature (for example, UV curing is limited in thickness).

In embodiments, a material for three-dimensional printing comprises a functionalized silicone polymer or functionalized silica particle, wherein the silicone polymer or silica particle is functionalized with a member of the group consisting of a carboxylic acid group, an amine group, and combinations thereof. In embodiments, the hardness of the material is determined by selection of concentration of the carboxylic acid group, concentration of the amine group, ratio of the carboxylic acid to amine groups, or a combination thereof, on the functionalized silicone polymer or functionalized silica particle. In embodiments, the three-dimensional printing material has the characteristic of hardening without requiring ultra-violet irradiation.

The functionalized silicone polymer or functionalized silica particle can be functionalized with any suitable or desired hardening additive. In embodiments, the functionalized silicone polymer or functionalized silica particle is functionalized by chemically modifying the silicone polymer or silica with a carboxylic acid group-containing additive, an amine group-containing additive, or a combination thereof.

In embodiments, the functionalized silicone polymer or functionalized silica particle is functionalized with at least one member of the group consisting of a carboxylic acid-containing compound, an amine-containing compound, and combinations thereof.

Any suitable or desired silicone polymer can be selected for the three-dimensional printing material herein. In embodiments, the silicone polymer is a member of the group consisting of poly(dimethyl siloxane), vinyl-terminated polydimethylsiloxane, methylhydrosiloxane-dimethylsiloxane copolymer, (methacryloxypropyl)methylsiloxane-dimethylsiloxane copolymer, aminopropylmethylsiloxane-dimethylsiloxane copolymer, and combinations thereof.

In embodiments, the starting materials for the preparation of functionalized silicones are poly(dimethyl siloxane) copolymers with amino groups (amino-PDMS). In certain embodiments, the functionalized silicone polymer is a member of the group consisting of aminoethylaminopropyl-methylsiloxane dimethylsiloxane copolymer, aminopropyl-methylsiloxane-dimethylsiloxane copolymer, and combinations thereof.

The functionalized silicone copolymer can be present in any suitable or desired amount. In embodiments, the functionalized silicone copolymer is selected in an amount of from about 10 to about 100, or from about 20 to about 80, or from about 40 to about 50 percent by weight based upon the total weight of all of the silicone polymer used. In embodiments, the functionalized silicone copolymer (starting materials) comprise from about 5 to about 50 percent aminopropyl-methylsiloxane monomer units, and from about 5 to about 25 percent aminopropyl-methylsiloxane monomer units, by moles, based upon the total moles of the silicone monomers.

The amino-functionalized silicone polymers or copolymers can be further modified with carboxylic acid groups by the addition of various anhydride-containing molecules. The type of anhydride molecule selected affects the final material properties. For example, (2-dodecen-1-yl)succinic anhydride contains a long hydrophobic alkyl chain that could impart more flexibility and hydrophobicity to the material. The different types of substituted anhydride-containing molecules can be used to incorporate additional functional groups into the amino-silicone. For example, 1,2,4-benzenetricarboxylic anhydride can be reacted with amino-silicone to yield a polymer functionalized with double the amount of carboxylic acid groups compared to unsubstituted anhydride molecules, such as succinic anhydride. 2,3-pyridinedicarboxylic anhydride is a building block that can be coupled to amine groups of the amino-silicone and its derivatives have been shown to have antimicrobial properties. (Ammar, Y. A., et al. "Reactivity of 2,3-Pyridine Dicarboxylic Anhydride Towards some Nitrogen Nucleophilic Reagents: Synthesis and Antimicrobial Evaluation of some Pyridine Carboxamide and Pyrrolo [3,4-B] Pyridine-5,7-Dione Derivatives." Chemical Sciences Journal, CSJ-16 (2011).

In embodiments, the functionalized silicone polymer is a member of the group consisting of aminoethylaminopropyl-methylsiloxane dimethylsiloxane copolymer, aminopropyl-methylsiloxane-dimethylsiloxane copolymer, and combinations thereof; and the silicone copolymer with amine groups is further functionalized with a carboxylic group by the addition of an anhydride-containing molecule selected from the group consisting of maleic anhydride, succinic anhydride, itaconic anhydride, phthalic anhydride, glutaric anhydride, (2-dodecen-1-yl)succinic anhydride, 1,2,4-benzenetricarboxylic anhydride and combinations thereof.

Epoxy-functionalized silicone polymers or copolymers, in embodiments, poly(dimethyl siloxane) copolymers, are suitable starting materials for the preparation of the amine-functionalized three-dimensional printing material. In embodiments, the functionalized silicone polymer is an epoxy-functionalized silicone polymer selected from the group consisting of (epoxypropoxypropyl)methylsiloxane-dimethylsiloxane copolymer, (epoxycyclohexylethyl)methylsiloxane-dimethylsiloxane copolymer and combinations thereof.

The epoxy functionalized silicone copolymer can be present in any suitable or desired amount. In embodiments, the epoxy functionalized silicone copolymer is selected in an amount of from about 10 to about 100, or from about 20 to about 80, or from about 40 to about 50 percent by weight based upon the total weight of all of the silicone copolymer used. In embodiments, from about 5 to about 50, or from about 5 to about 25 monomer units, by moles, of epoxy-propoxypropyl-methylsiloxane monomer is selected, based upon the total moles of silicone monomers.

In embodiments, the functionalized silicone polymer is an epoxy-functionalized silicone polymer, wherein the epoxy-functionalized silicone polymer further comprises amine groups that are incorporated into the epoxy-functionalized silicone polymer by the addition of an amine-containing nucleophile.

Any suitable or desired amine-containing nucleophile can be selected. In embodiments, the amine-containing nucleophile is selected from the group consisting of 3-(dimethylamino)-1-propylamine, 1-(2-aminoethyl) piperazine, N-(3-aminopropyl)-diethanolamine), allantoin and combinations thereof.

Functionalized silica particles can be prepared according to a modified Stober synthesis method using an amine group-containing silica precursor. Any suitable or desired amine group-containing silica precursor can be selected. In embodiments, the amine group-containing silica precursor is selected from the group consisting of aminopropyltriethoxysilane, aminopropyltrimethoxysilane, and combinations thereof.

In embodiments, the functionalized silica particle is an amino-functionalized silica particle comprising the reaction product of a member of the group consisting of aminopropyltriethoxysilane, tetraethyl orthosilicate, aminopropyltrimethoxysilane, tetramethyl orthosilicate, and combinations thereof.

The resulting silica particles can be subsequently modified with anhydride molecules, such as maleic anhydride, in order to form carboxylic acid functionalized silica particles.

Thus, in embodiments, the functionalized silica particle is an amino-functionalized silica particle. In embodiments, the functionalized silica particle is an amino-functionalized silica particle that is further functionalized with a carboxylic acid.

In embodiments, the functionalized silica particle is an amino-functionalized silica particle that is further functionalized with an anhydride-containing molecule or a carboxylic acid-containing molecule;

wherein the anhydride-containing molecule is selected from the group consisting of maleic anhydride, succinic anhydride, itaconic anhydride, phthalic anhydride, glutaric anhydride, (2-dodecen-1-yl)succinic anhydride, and combinations thereof; and wherein the carboxylic acid-containing molecule is selected from the group consisting of maleic acid, itaconic acid, phthalic acid, glutaric acid, (2-dodecen-1-yl)succinic acid, and combinations thereof.

The three-dimensional printing material herein can further contain a silicone elastomer resin. Thus, an additional type of silicone, in embodiments, a UV curable silicone, a thermally curable silicone, or a combination thereof, can be combined with one or more of the present functionalized silicone polymers or functionalized silica particles, to form a three-dimensional printing material. In embodiments, one or more of the present functionalized silicone polymers or functionalized silica particles can be combined with a typical silicone resin, such as a silicone elastomer resin, to modify the final properties. Any suitable or desired silicone elastomer resin can be selected. In embodiments, the silicone elastomer resin is selected from the group consisting of vinyl-terminated polydimethylsiloxane, methylhydrosiloxane-dimethylsiloxane copolymer, (methacryloxypropyl)methylsiloxane-dimethylsiloxane copolymer, aminopropylmethylsiloxane-dimethylsiloxane copolymer, and combinations thereof.

The functionalized silicone materials herein can be prepared by any suitable or desired process including combining functionalized silicone polymer particles with silica particles and silicone elastomer resins. In embodiments, the functionalized silicone materials herein can be prepared according to a two-step process comprising: (1) functionalization of silicone polymer chains and/or silica particles with amine and carboxylic acid groups; and (2) incorporation of functionalized silicone polymers and/or silica particles into a three-dimensional material, optionally, a UV curable or thermally curable silicone system.

In embodiments, a process for preparing a material for three-dimensional printing herein comprises providing a silicone polymer or a silica particle; and functionalizing the silicone polymer or silica particle with a member of the group consisting of a carboxylic acid, an amine, and combinations thereof. In certain embodiments, functionalizing comprises functionalizing the silicone polymer or silica particle with at least one member of the group consisting of a carboxylic acid-containing compound, an amine-containing compound and combinations thereof.

Further provided herein is a method for three-dimensional printing. Any suitable or desired printing method may be selected for the present three-dimensional printing materials.

A method for three-dimensional printing comprises providing a material for three-dimensional printing comprising a functionalized silicone polymer or functionalized silica particle, wherein the silicone polymer or silica particle is functionalized with a member of the group consisting of a carboxylic acid, amine and combinations thereof; disposing the material in one or more layers; and optionally, exposing the disposed material to at least one treatment to cure the material.

In embodiments, exposing the material to at least one treatment to cure the material comprises curing the material with heat or ultra-violet irradiation. In embodiments, exposing the material to at least one treatment to cure the material comprises a two-stage process comprising a first stage comprising physical hardening via intermolecular interactions of functional groups; and a second stage comprising exposing the material to chemical curing, ultra-violet irradiation, thermal curing, or a combination thereof. Exposing the material to at least one treatment to cure the material can comprise curing the material without use of ultra-violet irradiation. The material and method herein enables mechanical reinforcement that is independent of material thickness and temperature providing an advantage over UV dependent systems that are limited in thickness.

In embodiments, the present material for three-dimensional printing can be employed in a method of material extrusion where a viscous fluid or paste is dispensed through a nozzle.

EXAMPLES

The following are examples that are being submitted to further define various species of the present disclosure. Example 1 and Example 2 describe the preparation of functionalized silicone materials that was conducted. Examples 3-8 are prophetic examples that describe variations and formulations of functionalized silicone materials. These Examples are intended to be illustrative only and are not intended to limit the scope of the present disclosure. Also, parts and percentages are by weight unless otherwise indicated.

Copolymers of poly(dimethyl siloxane) can be obtained from Gelest Inc.

Example 1

Preparation of silicone material functionalized with amine and carboxylic acid groups.

The amine-functionalized silicone copolymer, 18 to 24 percent aminoethylaminopropylmethylsiloxane-dimethylsiloxane copolymer, 300-500 cSt, was obtained from Gelest, Inc. The amine-functionalized silicone copolymer was further modified with carboxylic acid groups. 18 to 24 percent aminoethylaminopropylmethylsiloxane-dimethylsiloxane copolymer, 2 grams, was dissolved in tetrahydrofuran, 2 milliliters, at room temperature at a stirring rate of 500 revolutions per minute (RPM). Succinic anhydride, 0.14 grams, was dissolved in 1 milliliter of tetrahydrofuran and added dropwise into the polymer solution, followed by stirring for 24 hours. Hexamethyldisilazane treated silica, 0.6 gram, was dispersed in 2 milliliters of tetrahydrofuran and added into the polymer solution, followed by stirring for 2 hours at 500 rpm. The resulting mixture was dried at room temperature and formed a hardened elastomeric material. The material was subsequently dried under vacuum. The material hardness was tested by Shore durometer type A-2, and it had a hardness of Shore 70 A.

Example 2

A functionalized silicone material was prepared according to the process in Example 1. The quantity of succinic anhydride used was 0.27 gram. After drying, the material hardened and had a hardness of Shore A 79.

Example 3

Amino-functionalized silica particles. Silica precursor mixture is prepared by mixing 0.2 gram tetramethyl orthosilicate and 0.2 gram aminopropyltriethoxysilane. This mixture is added dropwise to an aqueous solution of 0.1 gram Triton™ X-100 (4-(1,1,3,3-Tetramethylbutyl)phenyl-polyethylene glycol) in 10 milliliters of deionized water under vigorous stirring. The solution is stirred at room temperature for 24 hours. The particles are purified by centrifugation.

Example 4

Carboxylic acid functionalized silica particles. The product of Example 3 is combined with a solution of 20 milligrams of maleic anhydride in acetone. The solution is stirred for 24 hours at room temperature.

Example 5

Thermally cured functionalized silicone material is prepared having the components as shown in Table 1.

TABLE 1

| Component | Weight Percent |
|---|---|
| Vinyl-terminated polydimethylsiloxane, ~1,000 Cst | 50 |
| Silicone polymer (Example 1) | 12 |
| Hexamethyldisilazane treated silica | 22 |
| Carboxylic acid functionalized silica particles (Example 4) | 12 |
| Methylhydrosiloxane-dimethyl-siloxane copolymer ~2,000 Cst | 4 |
| Platinum-divinyltetramethyldisiloxane complex; 3.0% Pt | 200 ppm |
| Total | 100 |

Example 6

Comparative example of thermally cured silicone material is prepared having the components as shown in Table 2.

TABLE 2

| Component | Weight Percent |
|---|---|
| Vinyl-terminated polydimethylsiloxane, ~1,000 Cst | 62 |
| Hexamethyldisilazane treated silica | 34 |
| Methylhydrosiloxane-dimethyl-siloxane copolymer ~2,000 Cst | 4 |
| Platinum-divinyltetramethyldisiloxane complex; 3.0% Pt | 200 ppm |
| Total | 100 |

Example 7

UV cured functionalized silicone material is prepared having the components as shown in Table 3.

TABLE 3

| Component | Weight Percent |
|---|---|
| 7-9% (methacryloxypropyl)methylsiloxane-dimethylsiloxane copolymer, ~2,500 Cst | 52 |
| Silicone polymer (Example 2) | 12 |
| Hexamethyldisilazane treated silica | 22 |
| Amino-functionalized silica particles (Example 3) | 12 |
| Benzoin ethyl ether | 2 |
| Total | 100 |

Example 8

Comparative example of UV-cured silicone material is prepared having the components as shown in Table 4.

TABLE 4

| Component | Weight Percent |
|---|---|
| 7-9% (methacryloxypropyl)methylsiloxane-dimethylsiloxane copolymer, ~2,500 Cst | 64 |
| Hexamethyldisilazane treated silica | 34 |
| Benzoin ethyl ether | 2 |
| Total | 100 |

Thus, provided are silicone materials with carboxylic acid and amine groups having intermolecular interactions in the form of ionic and hydrogen bonding that are not present in comparative silicone materials. These additional interactions between functionalized components contribute to physical hardening of the material.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A material for three-dimensional printing comprising:
a dry three-dimensional printing material comprising a functionalized silicone polymer and a functionalized silica particle;
wherein the functionalized silicone polymer is functionalized with a member of the group consisting of a carboxylic acid, an amine, and combinations thereof; and
wherein the functionalized silica particle is functionalized with a member of the group consisting of a carboxylic acid, an amine, and combinations thereof;
wherein the dry three-dimensional printing material has a hardness determined by the selection of concentration of carboxylic acid, concentration of amine, ratio of carboxylic acid to amine, or a combination thereof, on the functionalized silicone polymers or functionalized silica particles.

2. The material of claim 1, wherein the material has the characteristic of hardening without requiring ultra-violet irradiation.

3. The material of claim 1, wherein the functionalized silicone polymer or functionalized silica particle is functionalized with at least one member of the group consisting of a carboxylic acid-containing compound, an amine-containing compound, and combinations thereof.

4. The material of claim 1, wherein the silicone polymer is a member of the group consisting of poly(dimethyl siloxane), vinyl-terminated polydimethylsiloxane, methylhydrosiloxane-dimethylsiloxane copolymer, (methacryloxypropyl)methylsiloxane-dimethylsiloxane copolymer, aminopropylmethylsiloxane-dimethylsiloxane copolymer, and combinations thereof.

5. The material of claim 1, wherein the functionalized silicone polymer is a member of the group consisting of aminoethylaminopropyl-methylsiloxane dimethylsiloxane copolymer, aminopropylmethylsiloxane-dimethylsiloxane copolymer, and combinations thereof.

6. The material of claim 1, wherein the functionalized silicone polymer is a member of the group consisting of aminoethylaminopropyl-methylsiloxane dimethylsiloxane copolymer, aminopropylmethylsiloxane-dimethylsiloxane copolymer, and combinations thereof; and
wherein the functionalized silicone polymer is further functionalized with a carboxylic group by the addition of an anhydride-containing molecule selected from the group consisting of maleic anhydride, succinic anhydride, itaconic anhydride, phthalic anhydride, glutaric anhydride, (2-dodecen-1-yl)succinic anhydride, 1,2,4-benzenetricarboxylic anhydride, 2,3-pyridinedicarboxylic anhydride, and combinations thereof.

7. The material of claim 1, wherein the functionalized silicone polymer is an epoxy-functionalized silicone polymer selected from the group consisting of (epoxypropoxypropyl)methylsiloxane-dimethylsiloxane copolymer, (epoxycyclohexylethyl)methylsiloxane-dimethylsiloxane copolymer, and combinations thereof.

8. The material of claim 1, wherein the functionalized silicone polymer is an epoxy-functionalized silicone polymer, wherein the epoxy-functionalized silicone polymer further comprises amine groups that are incorporated into the epoxy-functionalized silicone polymer by the addition of an amine-containing nucleophile.

9. The material of claim 8, wherein the amine-containing nucleophile is selected from the group consisting of 3-(dimethylamino)-1-propylamine, 1-(2-aminoethyl) piperazine, N-(3-aminopropyl)-diethanolamine), allantoin, and combinations thereof.

10. The material of claim 1, wherein the functionalized silica particle is an amino-functionalized silica particle comprising the reaction product of a member of the group consisting of aminopropyltriethoxysilane, tetramethyl orthosilicate, aminopropyltrimethoxysilane, tetramethyl orthosilicate, and combinations thereof.

11. The material of claim 1, wherein the functionalized silica particle is an amino-functionalized silica particle that is further functionalized with a carboxylic acid.

12. The material of claim 1, wherein the functionalized silica particle is an amino-functionalized silica particle that is further functionalized with an anhydride-containing molecule or a carboxylic acid-containing molecule;
wherein the anhydride-containing molecule is selected from the group consisting of maleic anhydride, succinic anhydride, itaconic anhydride, phthalic anhydride, glutaric anhydride, (2-dodecen-1-yl)succinic anhydride, and combinations thereof; and
wherein the carboxylic acid-containing molecule is selected from the group consisting of maleic acid, itaconic acid, phthalic acid, glutaric acid, (2-dodecen-1-yl)succinic acid, and combinations thereof.

13. The material of claim 1, further comprising:
a silicone elastomer resin selected from the group consisting of vinyl-terminated polydimethylsiloxane, methylhydrosiloxane-dimethylsiloxane copolymer, (methacryloxypropyl)methylsiloxane-dimethylsiloxane copolymer, aminopropylmethylsiloxane-dimethylsiloxane copolymer and combinations thereof.

14. A process for preparing a material for three-dimensional printing comprising:
providing a silicone polymer and a silica particle; and
functionalizing the silicone polymer with a member of the group consisting of a carboxylic acid, an amine, or a combination thereof;
functionalizing the silica particle with a member of the group consisting of a carboxylic acid, an amine, or a combination thereof;
to provide a dry three-dimensional printing material, wherein the dry three-dimensional printing material has a hardness determined by the selection of concentration of carboxylic acid, concentration of amine, ratio of carboxylic acid to amine, or a combination thereof, on the functionalized silicone polymers and functionalized silica particles.

15. The process of claim 14, wherein functionalizing comprises functionalizing the silicone polymer Of and silica particle with at least one member of the group consisting of a carboxylic acid-containing compound, an amine-containing compound, an anhydride compound, or a combination thereof.

16. The process of claim 14, wherein the silicone polymer is a member of the group consisting of poly(dimethyl siloxane), vinyl-terminated polydimethylsiloxane, methylhydrosiloxane-dimethylsiloxane copolymer, (methacryloxypropyl)methylsiloxane-dimethylsiloxane copolymer, aminopropylmethylsiloxane-dimethylsiloxane copolymer, and combinations thereof.

17. A method for three-dimensional printing comprising:
providing a dry three-dimensional printing material comprising a functionalized silicone polymer and a functionalized silica particle; wherein the functionalized silicone polymer is functionalized with a member of the group consisting of a carboxylic acid, an amine, and combinations thereof; and wherein the functionalized silica particle is functionalized with a member of the group consisting of a carboxylic acid, an amine, and combinations thereof wherein the dry three-dimensional printing material has a hardness determined by the selection of concentration of carboxylic acid, concentration of amine, ratio of carboxylic acid to amine, or a combination thereof, on the functionalized silicone polymers or functionalized silica particles;
disposing the material in one or more layers; and
optionally, exposing the disposed material to at least one treatment to harden or cure the material.

18. The process of claim 17, wherein exposing the material to at least one treatment to cure the material comprises a two-stage process comprising a first stage comprising physical hardening via intermolecular interactions of functional groups; and a second stage comprising exposing the material to chemical curing, ultra-violet irradiation, thermal curing, or a combination thereof.

19. The process of claim 17, wherein exposing the material to at least one treatment to cure the material comprises curing the material with heat or ultra-violet irradiation.

20. The process of claim 17, wherein the functionalized silicone polymer and functionalized silica particle is functionalized with at least one member of the group consisting of a carboxylic acid-containing compound, an amine-containing compound, an anhydride compound, and combinations thereof.

21. The material of claim 1, wherein the material comprises a functionalized silicone polymer, wherein the silicone polymer is functionalized with amine and carboxylic acid groups.

22. The process of claim 14, wherein the providing comprises providing a silicone polymer; and
wherein functionalizing comprises functionalizing the silicone polymer amine and carboxylic acid groups.

23. The process of claim 17, wherein the material comprises a functionalized silicone polymer, wherein the silicone polymer is functionalized with amine and carboxylic acid groups.

24. The material of claim 1, wherein the dry three-dimensional printing material has the characteristic of curing by a two-stage process comprising a first stage comprising physical hardening via intermolecular interactions of functional groups; and a second stage comprising exposing the material to chemical curing, ultra-violet irradiation, thermal curing, or a combination thereof.

* * * * *